United States Patent
Aizawa

[11] Patent Number: 6,152,569
[45] Date of Patent: Nov. 28, 2000

[54] FLAT LIGHT SOURCE DEVICE FOR ILLUMINATION USE

[75] Inventor: Masanobu Aizawa, Iwaki, Japan

[73] Assignee: Stanley Electric Co., Ltd., Tokyo, Japan

[21] Appl. No.: 09/236,599

[22] Filed: Jan. 26, 1999

[30] Foreign Application Priority Data

Feb. 20, 1998 [JP] Japan ................................. 10-038819

[51] Int. Cl.$^7$ ................................................. G01D 11/28
[52] U.S. Cl. ............................................. 362/27; 362/31
[58] Field of Search ............................ 362/26, 27, 31, 362/231, 263; 349/65, 68, 70

[56] References Cited

U.S. PATENT DOCUMENTS 5,039,207  8/1991  Green ........................................... 349/70
5,669,693  9/1997  Smith ........................................... 362/31

FOREIGN PATENT DOCUMENTS 3-59524  3/1991  Japan .

Primary Examiner—Y. Quach
Attorney, Agent, or Firm—James Creighton Wray; Meera P. Narasimhan

[57] ABSTRACT

An object of the invention is to provide a thin flat light source device for illumination use such as for a back-illumination of an LCD display etc. which is obtained by thinning a light-guiding plate even when it is illuminated by a multi-colored source. A rear surface of the light-guiding plate 1 having a planar front light-emitting surface 2 is worked by a tapered knurling method to form a light-diffusing surface 3. Two discharge tubes are disposed as light sources outside a side surface 4 of the light-guiding plate 1 in parallel to the light-emitting surface 2 as well as to the side surface 4 so that a virtual plane defined by both central axes of the two tubes intersects substantially perpedicularly the side surface 4. One of the discharge tubes located inside is a red neon tube 5 formed of a transparent glass while another of the discharge tubes located outside is a cold cathode fluorescent tube 6 which emits a desirable luminescent color except for the red. A reflecting plate 7 is disposed enclosing those discharge tubes.

4 Claims, 2 Drawing Sheets

FLAT LIGHT SOURCE DEVICE FOR ILLUMINATION USE

BACKGROUND OF THE INVENTION

1. Field of the Invention

The present invention relates to a flat light source device having a multi-colored luminescence which is suitable for a back illumination of a liquid crystal display (referred to as "LCD") device such as for use in a car speedometer.

2. Brief Description of the Prior Art

In recent years, a flat light emission device formed of a light-guiding plate combined with a fluorescent lamp having a cold cathode as a light source has frequently been employed as a light source device for illuminating an LCD display device. FIGS. 3A and 3B are views showing a schematic constitution of a conventional example of the flat light emitting devices mentioned above, wherein FIG. 3A is a plan view and FIG. 3B is a cross-sectional side view.

In FIGS. 3A and 3B, a numeric sign 11 stands for a light-guiding plate, a front surface of which is a planar-shaped light-emitting surface 12 and a rear surface of which is a tapered light-diffusing surface 13. Two cold cathode fluorescent lamps 15 and 16 are disposed adjacently to a side surface 14 of the light-guiding plate 11 wherein they are aligned in parallel to each other. Herein the fluorescent lamp 15 emits colored rays of light while another fluorescent lamp 16 emits white rays of light. The lights emitted from those fluorescent lamps 15 and 16 intrude either directly or being reflected from a reflecting plate 17 into an inside of the light-guiding plate 11 to be diffusibly reflected on a light-diffusing surface 13 toward various directions as can be seen from arrows shown in FIG. 3B. Those rays of light are then transmitted from the light-emitting surface 12 as the flat light emission being averaged in intensity.

The flat light-emitting source device constituted mentioned above can illuminate the LCD device for monochromatic (black and white) display use by a dichromatic illumination and, consequently, the two fluorescent lamps 15 and 16 having respectively different luminescent colors from each other are employed therein. Further, the various luminescent colors such as white, red, green, blue etc. are obtainable by blending fluorescent materials, which renders it capable to illuminate the LCD device in plurality of the colored rays.

However, to attain the multi-colored illumination in the conventional flat light source device mentioned above, it requires the constitution wherein a virtual plane defined by both central axes of the two fluorescent lamps orients perpendicular with respect to the light-emitting surface 12 of the light-guiding plate 11 so that dimensions of the device are enlarged in thickness. The dimensional enlargement of the light-guiding plate in thickness induces a problem that slenderization of the device turns incapable.

SUMMARY OF THE INVENTION

The present invention is carried out to solve the problem mentioned above. An object of the present invention is to provide a slenderization-capable flat light source device for illumination use wherein a thickness of a light-guiding plate is reducible even when a multi-colored illumination is employed.

To satisfy the object mentioned above, a flat light source device according to the present invention is constituted as follows:

(1) It comprises:

a light-guiding plate having a planar light-emitting surface for emitting rays of light and having a tapered light-diffusing surface on an opposite side of the light-emitting surface of the plate; and two discharge tubes equipped outside a side surface of the light-guiding plate as light sources, wherein:

aforesaid two discharge tubes are disposed substantially in parallel to the light-emitting surface as well as substantially in parallel to the side surface;

a virtual plane defined by both central axes of the two tubes orients substantially orthogonal with respect to the side surface; and the discharge tube disposed more adjacently to the side surface of the light-guiding plate than another is a neon tube formed of a transparent glass.

(2) The flat light source device according to the constitution mentioned in (1), further comprising:

other discharge tubes additionally disposed as the light sources outside an opposite-sided side surface of (1).

(3) The flat light source devices according to the constitutions mentioned in (1) and (2), wherein:

the light-diffusing surface of the light-guiding plate is worked by a knurling method.

(4) The flat light source devices according to the constitutions described from (1) to (3), wherein:

the discharge tubes except for the neon tubes are fluorescent lamps having cold cathodes.

DETAILED DESCRIPTION OF THE PREFERRED EMBODIMENTS

Hereinafter described are the preferred embodiments according to the present invention with reference to the drawings of FIGS. 1A, 1B and 2. The best modes contemplated by the inventor during carrying out the present invention into the practice are also described corresponding to the preferred embodiments.

Embodiment 1

Figure 1A:
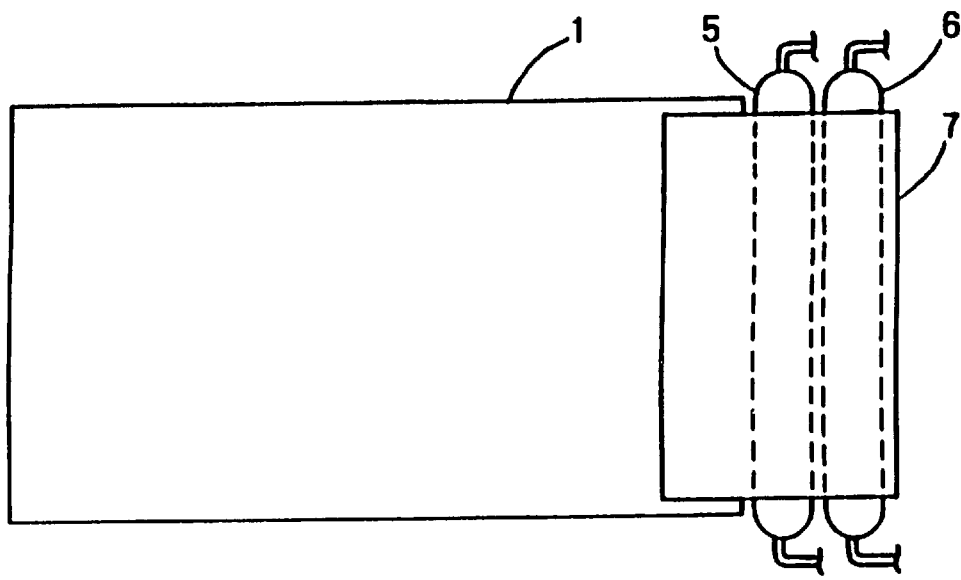
FIGS. 1A and 1B are schematic views showing a constitution of an embodiment according to the present invention.
Figure 1B:
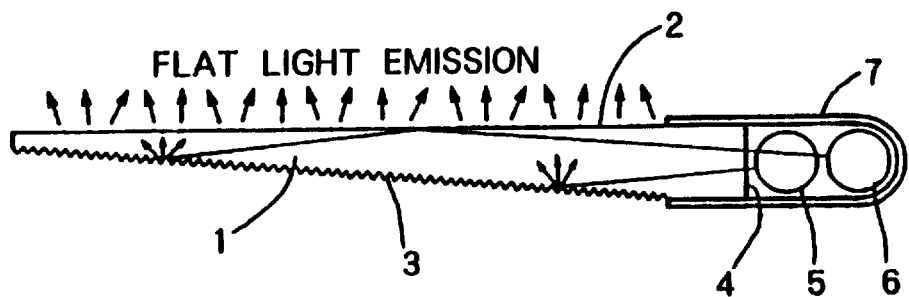

FIGS. 1A and 1B are schematic views showing a constitution of an embodiment according to the present invention, wherein FIG. 1A is a plan view and FIG. 1B is a cross-sectional side view.

In FIGS. 1A and 1B, a numeric sign 1 stands for a light-guiding plate formed of an acrylic polymer for producing a planar light emission, a front surface of which is finished to be a planar light-emitting surface 2 and a rear surface of which is worked by a tapered knurling method etc. to be an uneven light-diffusing surface 3. A numeric sign 4 stands for a side surface of the light-guiding plate 1, in an outside vicinity of which two discharge tubes are disposed in parallel to the light-emitting surface 2 as well as to the side surface 4 in a manner wherein a virtual plane defined by both central axes of the two tubes orients perpendicular with respect to the side surface 4. One of the discharge tubes which is more adjacently located to the side surface 4 is a neon tube 5 formed of a transparent glass while another discharge tube more remotely located from the side surface 4 is a cold cathode fluorescent lamp 6 formed of a glass tube, an inner wall of which is coated with fluorescent materials. A numeric sign 7 stands for a reflecting plate which is disposed enclosing the neon tube 5 together with the cold cathode fluorescent lamp 6 to serve for reflecting the respectively emitted rays of lights so that they are effectively intruded into the light-guiding plate 1.

The above-mentioned constitution of the flat light-emitting source device can reduce a thickness of the source device for bicolored illumination use to an extent which is dimensionally equivalent to that of the device for monochromatic illumination use. To satisfy the purpose mentioned above, the two discharge tubes are equipped as light sources so that the virtual plane defined by both central axes of the discharge tubes is aligned in parallel to the light-emitting surface 2 of the light-guiding plate 1 of the planar light source device for monochromatic illumination use. Further, the neon tube 5 formed of the transparent glass tube is employed as the discharge tube located more adjacently to the side surface 4 which acts as an incoming port of incident lights generated from the discharge tubes into the light-guiding plate 1 while the ordinary cold cathode fluorescent lamp 6 is employed as another discharge tube located more remotely from the side surface 4.

Incidentally, the discharge tubes which are formed of the transparent glass are only the red neon tubes in general and all of other tubes are coated with the fluorescent materials. Accordingly, the constitution according to the present invention disposes the red neon tube 5 inside and selects other colors except for the red as the luminescent colors of the cold cathode fluorescent lamp 6 located outside.

First, when only the cold cathode fluorescent lamp 6 located outside is turned on, the flat light emission having the same luminescent color as that of the lamp 6 is obtained from the light-emitting surface 2 of the light-guiding plate 1. On that occasion, as the glass of the neon tube 5 located inside is transparent, the neon tube 5 does not hinder the rays of light generated from the cold cathode fluorescent lamp 6 from passing through anymore as can be seen from FIG. 1B. As a result, the rays of light emitted from the cold cathode fluorescent lamp 6 intrude directly, via the reflecting plate 7 or through the transparent glass tube of the neon tube 5 into the inside of the light-guiding plate 1, wherein they diffuse on the light-diffusing surface 3 and transmit outside from the light-emitting surface 2 as a uniformed light.

Subsequently, when only the neon tube 5 located inside is lighted on, a red flat emission light emitted form the light-emitting plane 2 of the light-guiding plate 1 is similarly obtained.

Namely, the light-emitting source device for dichromatic illumination use such as red-and-white, red-and-green, red-and-blue etc. which has only the same thickness as that of the source device for monochromatic illumination use can be obtained corresponding to the luminescent colors of the cold cathode fluorescent lamp 6.

Furthermore, when the two discharge tubes composed of the neon tube 5 and the cold cathode fluorescent lamp 6 are simultaneously turned on, the luminescent color produced by mixing up both luminescent colors is obtained, which realizes a light source device for multi-colored illumination use.

Embodiment 2

Figure 2:
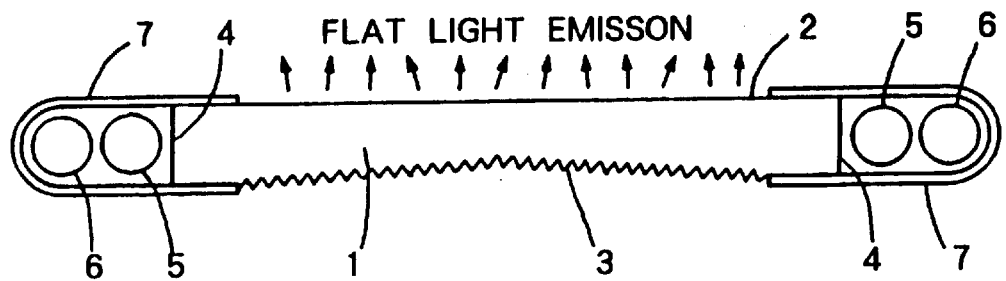
FIG. 2 is a cross-sectional side view showing another embodiment according to the present invention.
Figure 3A:
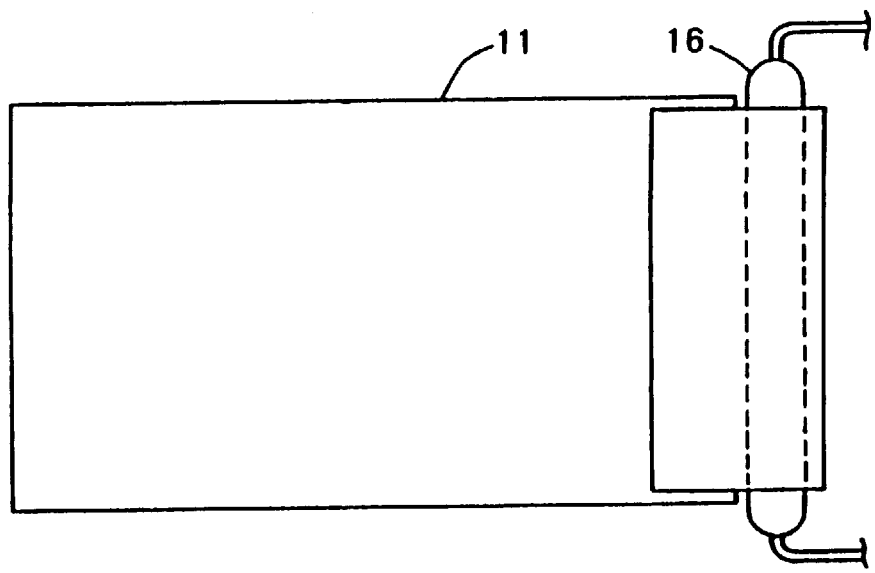
FIGS. 3A and 3B (PRIOR ART) are schematic views showing a constitution of a conventional example.
Figure 3B:
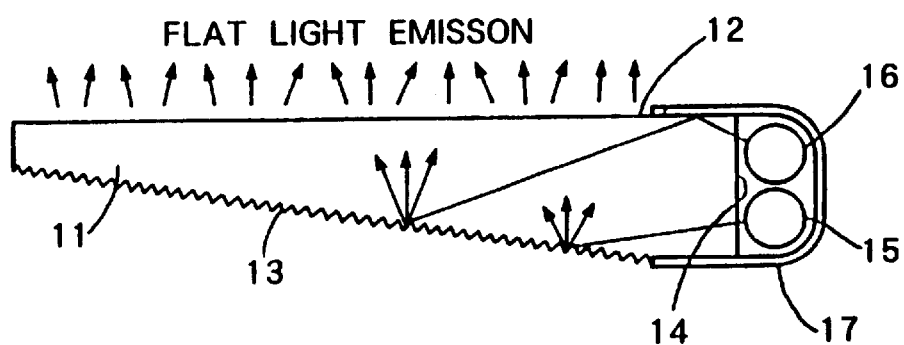

FIG. 2 is a cross-sectional side view showing an another embodiment according to the present invention. In the present embodiment, other discharge tubes are disposed additionally as other light sources adjacently outside another side surface 4 which is located on an opposite side of the original side surface 4. Because of the reasons mentioned previously, the discharge tube located inside is another red neon tube 5 having a transparent glass while the discharge tube located outside is another cold cathode fluorescent lamp 6 which emits a similar luminescent color to that of the original lamp 6. Accordingly, a uniformed planar light emission having a desirable luminescent color turns attainable.

Namely, a light-guiding plate 1 according to the present embodiment is worked to be tapered so as to be thin in a central portion and thick on both ends. If the discharge tubes located on both sides are rendered to be symmetrical to each other including the luminescent colors, the planar light emission having the uniformed color is obtained from the light emission plane 2.

As mentioned above, the constitutions according to the present invention can reduce the thickness of the light-guiding plate even when it is aimed to attain the multicolored illumination, which has an effect of enabling the down-sizing of the flat light source devices and equipment including them.

What is claimed is:

1. A flat light source device for illumination use, comprising:
    a light-guiding plate which has a planar-shaped light-emitting surface for emitting rays of light and has a tapered light-diffusing surface on an opposite side of said light-emitting surface of said plate; and
    two discharge tubes equipped outside a side surface of said light-guiding plate as light sources, wherein:
    said two discharge tubes are disposed substantially in parallel to said light-emitting surface as well as substantially in parallel to said side surface;
    a virtual plane defined by both central axes of said two discharge tubes orients substantially orthogonal with respect to said side surface; and
    one of said discharge tubes disposed more adjacently to said side surface of said light-guiding plate than another of said discharge tubes is a neon tube having a transparent glass.

2. The flat light source device according to claim 1, further comprising:
    other discharge tubes equipped additionally as other light sources outside another side surface located on an opposite side of said side surface of said light-guiding plate.

3. The flat light source device according to claim 1, wherein:
    said light-diffusing surface of said light-guiding plate is formed by a knurling method.

4. The flat light source device according to claim 1, wherein:
    said discharge tube except for said neon tube is fluorescent lamp having cold cathode.

* * * * *